Patented Oct. 12, 1954

2,691,648

UNITED STATES PATENT OFFICE 2,691,648

SULFURIZED TERPENE COMPOSITION

Reginald W. Ivett, Wilmington, Del., assignor to Hercules Powder Company, Wilmington, Del., a corporation of Delaware No Drawing. Application December 12, 1950, Serial No. 200,510

4 Claims. (Cl. 260—139)

This invention relates to sulfurized terpene compounds and more particularly to a process for sulfurizing 3-carene and to the product formed thereby.

The term "sulfurizing" as used herein means the process of combining a compound with elemental sulfur. Although it is known that various terpene compounds may be sulfurized, the products heretofore produced have lacked widespread utility due to their dark appearance, and even the lighter colored sulfurized terpenes which have been produced in the art have been so dark as to be unsuitable for many purposes. Also, the lighter colored sulfurized terpenes heretofore known have been attained only after extensive refining of the initial sulfurized terpene product or by carrying out the sulfurization process in the absence of air.

Now in accordance with this invention, it has been found that when a terpene mixture containing at least about 70% 3-carene and less than about 5% myrcene based upon the total weight of the mixture is heated with sulfur until all of the sulfur has reacted, the product produced is of an unusually light color. Moreover, this light-colored product is obtained without the use of any extensive refining process and may be produced without the usual precautionary measures practiced by the art in attempts to produce light-colored sulfurized products. Thus, there is no need to remove air from the reaction zone or to use inert atmospheres or the like during the sulfurization reaction. The sulfurized 3-carene product produced by this invention is substantially lighter in color than any sulfurized terpene known to the art.

In producing the product of this invention 3-carene of greater than 70% purity and containing less than about 5% myrcene, based upon the total weight of terpenes, is heated with from about 1% to about 70% by weight of sulfur, based upon the weight of the 3-carene mixture, at a temperature greater than 100° C. and preferably at the reflux temperature until all of the sulfur has reacted. At this point the reaction product is completely soluble in acetone. Unreacted terpene can be removed by distillation at reduced pressure, if desired. The sulfur content of the product may vary from about 1% to about 40% by weight of the final composition. By reacting 3-carene of this invention with from about 25% to about 55% by weight of sulfur based upon the 3-carene, there is obtained sulfurized 3-carene having a sulfur content of from about 20-35%, which is particularly useful due to its anticorrosive properties.

The following examples are illustrations of specific embodiments of the invention. All quantities are in parts by weight unless otherwise designated.

*Example I*

One hundred parts of 3-carene of purity greater than 95% and 33 parts of precipitated sulfur was placed in a reaction vessel fitted with a reflux condenser and a thermometer. The mixture was heated to the reflux temperature of 160° C. and refluxed for 30 minutes during which time the temperature of the reaction mixture increased to 190° C. The reaction mixture was then completely soluble in acetone, indicating that all the sulfur had reacted. The product was distilled at 60 mm. pressure and 105° C. Thirteen parts of a lower boiling fraction containing unreacted terpene was removed, leaving 123 parts of residue. The residue consisted of sulfurized 3-carene having a sulfur content of 25.8% sulfur by weight. A 10 mm. cube of the residue had a color of 80A+21R, which is the color produced by 80 amber units and 21 red units taken from the Lovibond Scale, Series 200.

*Example II*

Two hundred parts of 3-carene of purity greater than 95% and 28 parts of precipitated sulfur was placed in a reaction vessel fitted with a reflux condenser and a thermometer. Following the procedure of Example I, the mixture was heated at reflux for 30 minutes in an atmosphere of carbon dioxide. The reaction mixture was then sparged for 15 minutes with carbon dioxide to remove any hydrogen sulfide which may have been formed. A 10 mm. cube of the product had a color of 80A+4R on the Lovibond Scale, Series 200. The sulfur content of the product was 11% by weight.

*Example III*

Seventy-five parts of a terpene mixture containing 92% 3-carene and 3% myrcene was reacted with 25 parts of sulfur at reflux temperature according to the general procedure of Example II, but in an atmosphere of air. After 45 minutes, all of the sulfur had reacted. A 10 mm. cube of the product had a color of 80A+10R on the Lovibond Scale, Series 200.

*Example IV*

One hundred parts of a terpene mixture containing 81% 3-carene and 15% α-terpinene was reacted with 33 parts of sulfur according to the procedure of Example III. The reaction was complete after 30 minutes. A 10 mm. cube of the product had a color of 80A+2R on the Lovibond Scale, Series 200.

*Example V*

One hundred parts of a terpene mixture containing 81% 3-carene and 15% Δ$^{3,8(9)}$ p-menthadiene was reacted with 33 parts of sulfur according to the procedure of Example III. The sulfur was entirely reacted after 30 minutes. The 10 mm. cube of the product had a color of 80A+5R on the Lovibond Scale, Series 200.

*Example VI*

One hundred parts of a terpene mixture containing 90% 3-carene and 5% dipentene was reacted with 33 parts of sulfur according to the procedure of Example III. The reaction was complete after 30 minutes. A 10 mm. cube of the product had a color of 80A+5R on the Lovibond Scale, Series 200.

*Example VII*

Following the procedure of Example III, 100 parts of a terpene mixture containing 90% 3-carene and 5% p-cymene was reacted with 33 parts of sulfur. The sulfur was entirely reacted after 30 minutes. A 10 mm. cube of the product had a color of 80A+4R on the Lovibond Scale, Series 200.

*Example VIII*

Following the procedure of Example III, 100 parts of a terpene mixture containing 71% 3-carene and 25% β-pinene was reacted with 33 parts of sulfur. The reaction was complete after 30 minutes. A 10 mm. cube of the product had a color of 80A+28R on the Lovibond Scale, Series 200.

*Example IX*

One hundred parts of a terpene mixture containing 71% 3-carene and 25% α-pinene was reacted with 33 parts of sulfur according to the procedure of Example III. The reaction was complete after 30 minutes. A 10 mm. cube of the product had a color of 80A+12R on the Lovibond Scale, Series 200.

Although the examples have shown the preparation of the sulfurized 3-carene of this invention by heating sulfur and 3-carene together at reflux temperature, the reaction may also be carried out by adding 3-carene slowly at the reaction temperature to molten sulfur. In either case, the reaction may be carried out under pressure to shorten the reaction time. Any excess free sulfur, which may be present after the reaction is complete, can be removed by washing the product with aqueous sodium sulfide.

It is to be noted that the light color of the product of this invention is not a general characteristic of all sulfurized terpenes but is apparently restricted to sulfurized 3-carene of purity greater than about 70% and which is contaminated with not more than 5% myrcene by weight based upon the total terpene content. Sulfurized pure dipentene which heretofore has been considered among the lighter colored sulfurized terpenes is substantially darker than the sulfurized 3-carene of this invention as rated on the Lovibond Scale.

The 3-carene utilized to produce the sulfurized product of this invention may contain limited quantities of other terpenes such as, for example, menthenes, menthadienes, dicyclic terpenes, etc. Specific terpenes which are usually found in source materials containing 3-carene are myrcene, α-pinene, β-pinene, cymenes, dipentene, and terpinenes. It is essential, however, that these terpenes be present in less than about 30% by weight and myrcene, in particular, be present in less than about 5% by weight of the total terpene mixture in order that the sulfurized product will possess the desirable light color of the product of this invention.

Internal combustion engines and particularly engines designed for heavy duty work often operate under severe conditions involving high temperatures and heavy loads and under these conditions even the highest grade lubricants exert an oxidizing or corrosive action on the metal surfaces with which the lubricant comes in contact. This corrosive action results ultimately in a loss of efficiency of the engine due to enlarged clearances and weakening of the lubricated metallic parts. To a great extent the corrosive or oxidizing action of petroleum lubricants can be overcome by incorporating into these lubricants a small amount, usually less than 3%, of the sulfurized 3-carene of this invention. Lubricants containing this sulfurized 3-carene product possess exceptional anticorrosive properties. In addition, due to the light color of the sulfurized 3-carene of this invention, the color of lubricants containing this sulfurized 3-carene is not appreciably darker than lubricants containing none of this additive. Consequently, by means of this invention, lubricants with anticorrosive properties can be prepared with significantly lighter color than was heretofore possible.

What I claim and desire to protect by Letters Patent is:

1. The light-colored reaction product of sulfur and 3-carene, said reaction product containing between about 1% and about 40% sulfur based on the weight of the total composition, said 3-carene being at least about 70% pure and containing less than about 5% myrcene based upon the total weight of terpenes, said reaction being carried out at a temperature greater than 100° C.

2. The composition of claim 1 in which the sulfur content is between about 20% and about 35% by weight of the total composition.

3. The process of producing a light-colored sulfurized 3-carene which comprises heating together sulfur and 3-carene at a temperature greater than 100° C., said 3-carene being at least about 70% pure and containing less than about 5% myrcene based upon the total weight of terpenes, the sulfur being in an amount between about 1% and about 70% by weight based on the 3-carene.

4. The process of claim 3 in which the sulfur amounts to between about 25% and about 55% by weight of the 3-carene.

References Cited in the file of this patent

UNITED STATES PATENTS

| Number | Name | Date |
|---|---|---|
| 2,329,486 | Rummelsburg | Sept. 14, 1943 |
| 2,402,698 | Werntz | June 25, 1946 |
| 2,417,305 | Knowles et al. | Mar. 11, 1947 |
| 2,537,297 | Alexander | Jan. 9, 1951 |
| 2,543,542 | Badertscher | Feb. 27, 1951 |

OTHER REFERENCES

"Organic Chemistry," Fieser et al., 1944, pp. 982–983.